United States Patent [19]

Prouse

[11] Patent Number: 6,043,298

[45] Date of Patent: Mar. 28, 2000

[54] SOLID FRITTED BONDING MATERIAL

[76] Inventor: David W. Prouse, 1820 Lincoln La., Salt Lake City, Utah 84124

[21] Appl. No.: 09/010,297

[22] Filed: Jan. 21, 1998

[51] Int. Cl.$^7$ .............................. C08L 91/06; C08K 5/01; C08K 3/40; C08K 3/10; C09J 191/06
[52] U.S. Cl. .......................... 523/164; 524/277; 106/272; 156/89.11; 156/89.16; 156/89.23; 156/325
[58] Field of Search ..................................... 524/277, 488; 106/270, 272; 156/89.11, 89.16, 89.23, 325

[56] References Cited

U.S. PATENT DOCUMENTS

| | | | |
|---|---|---|---|
| 3,267,052 | 8/1966 | Brennan | 523/164 |
| 3,931,055 | 1/1976 | Friese | 252/503 |
| 4,260,406 | 4/1981 | Corbett et al. | |
| 4,471,102 | 9/1984 | Petschke | 528/49 |
| 4,541,876 | 9/1985 | Hwang | 148/22 |
| 5,198,154 | 3/1993 | Yokoyama et al. | 252/514 |
| 5,331,023 | 7/1994 | Columbus et al. | |

OTHER PUBLICATIONS

Lewis Sr., Richard J.; Hawley's Condensed Chemical Dictionary 12th Ed., Van Nostrand Reinhold, New York (pp. 435, 1225), 1993.

*Primary Examiner*—Vasu Jagannathan
*Assistant Examiner*—Callie E. Shosho
*Attorney, Agent, or Firm*—Joy L. Bryant

[57] ABSTRACT

A solid fritted bonding material consisting essentially of a blended wax composition and a powder is provided. The solid fritted bonding material is used to secure at least two articles together by applying the solid fritted bonding material to mating surfaces of each article; joing the mating surfaces of each article together; and heating the joined articles to a temperature wherein the blended wax composition burns away and the powder becomes activated to form a permanent bond between each article.

6 Claims, No Drawings

SOLID FRITTED BONDING MATERIAL

FIELD OF THE INVENTION

The present invention is in the field of ceramic or metal sealing. In particular, it relates to a solid fritted bonding material and process for sealing together glass, ceramic, or metal parts.

BACKGROUND OF THE INVENTION

Metal, glass and ceramic parts are often bonded together using powders such as glass or metal that require high temperatures to activate the powder and form a bond between the parts. As a part of the bonding process, the parts must be properly positioned and stabilized before and while they are being heated. Such a process requires careful placement of the parts and application of the bonding powder so the bond is formed in the correct location. Often, a slight movement of the parts will cause the bond to be incorrectly positioned. This problem is usually overcome by forming a temporary seal between the parts before activating the powder.

Prior to the present invention, a temporary seal was formed between two parts by dispersing the powder in a solvent or an acrylic binder. The dispersion was then applied to the mating faces of the parts to be joined to form a temporary seal. The parts were then carefully placed within a furnace in such a way as to not break the temporary seal between the two parts. As the parts were heated, the solvent or acrylic binder would flash off and the powder would be activated to form the seal. Such a system is not environmentally friendly and usually requires special equipment and handling.

Moreover, problems resulted when the parts would be accidentally bumped or mispositioned in the furnace or when two parts having different shapes needed to be bonded together. In particular, problems arose in applications where a planar shaped part needed to be bonded to a cylindrical shaped part. This required special positioning of the parts so them would not become misaligned.

An object of the present invention is to provide a solid fritted bonding material for use as a both a temporary seal and a permanent seal between two articles.

Another object of the present invention is to provide a bonding material which does not contain hazardous materials or require special handling.

Another object of the present invention is to provide a process for securing at least two articles together using a solid fritted bonding material.

SUMMARY OF THE INVENTION

By the present invention, a solid fritted bonding material consisting essentially of a blended wax composition and a powder is provided. The blended wax composition can be modified in many ways to provide different degrees of tack in order to secure various articles together. When in use, at least two articles are secured together by applying the solid fritted bonding material to mating surfaces of each article. The mating surfaces are joined together and the joined articles are heated to a temperature wherein the blended wax composition burns away and the powder becomes activated to form a permanent bond between each article.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

DETAILED DESCRIPTION OF THE PREFERRED EMBODIMENTS

The benefit of using the solid fritted bonding material is seen where the blended wax composition allows for two parts to be temporarily bonded together before being fired in a furnace. This temporary bond overcomes the problem of parts becoming destabilized prior to heating. In addition, the solid fritted bonding material does not contain volatile organic solvents. The lack of volatile organic solvents eliminates the need for special handling requirements and complex storage requirements.

The solid fritted bonding material consists essentially of a blended wax composition and a powder. Any blended wax composition known to those skilled in the art may be used and in particular may be a combination of waxes selected from the group consisting of: microcrystalline waxes; processed beeswax; lanolin; plant waxes; and natural waxes. Many waxes are commercially available. Examples of a few of these types of waxes include but are not limited to: an ethylene homopolymer, C-14 alcohol known as UNILIN®700 ALCOHOL commercially available from Baker Petrolite Corporation; a polymerized C>10 alpha alkene known as VYBAR®825 POLYMER commercially available from Baker Petrolite Corporation; a microcrystalline wax known as ULTRAFLEX®AMBER WAX commercially available from Bareco Products; naturally occuring waxes; animal waxes; and plant waxes. The blended wax composition is formulated based on the final application and the desired properties. The hardness or tackiness of the wax is taken into consideration based on the parts to be joined and the application conditions. Since the blended wax composition serves to prevent slippage of the two parts prior to firing in a furnace, it is ultimately removed when the powder is heated and activated.

Once the blended wax composition is formulated, a powder is added. The powder added may be any powder which is known and used for bonding metals, glass, and ceramics together. Preferably, the powder has a particle size less than about 20 mesh and is either a glass or a metal. For ceramic applications, the powder is a glass. An example of such a powder is CB42 glass which is commercially available from James Kent, Ltd. in England.

The solid fritted bonding material may be further compounded with dispersants and pigments. Although not necessary, the dispersants will aid in distributing the powder in the wax and the pigments may be used for color coding the composition.

The solid fritted bonding material can be formed into any shape depending on the consistancy of the wax blend used. Ideally, the bonding material may be formed into a stick shape that may be used in a similar fashion as a writing instrument is used to mark a surface. Additionally, the solid fritted bonding material may be formed into a preformed shape such as: a ribbon; an o-ring; a circle; a trapezoid; a triangle; and a parallelogram. When the bonding material is of a preformed shape, it is easily positioned between mating surfaces of the articles which are pressed by hand together before placement in a furnace.

EXAMPLES

Example 1

A blended wax composition was prepared by the following formulation:

| | |
|---|---|
| 8.2 grams | Ethylene homopolymer and C-14 alcohol (melting point 160° F.) |
| 4.1 grams | Polymerized C > 10 alpha alkene |
| 2.1 grams | Alkylester C > 19 |
| 29.6 grams | Microcrystalline wax, clay treated (melting point 170° F.) |
| 0.1 gram | Colorant Pigment |
| 29.6 grams | Paraffin |
| 0.5 grams | Ethylene homopolymer (melting point 179° F.) |
| 0.5 grams | Ethylene homopolymer (melting point 185° F.) |

The blended wax composition was melt-mixed 50% by weight with CB42 glass from James Kent, Ltd. The melt was poured into an aluminum rod mold and cooled to solidify. The cooled rod-shaped product was then removed from the mold.

Example 2

An assembly of two ceramic pieces was prepared by joining the pieces together using the wax composition prepared according to example 1. A first ceramic piece was provided. The ceramic piece was flat. The rod-shaped wax composition of example 1 was used in a similar manner to a crayon to apply marks of the wax composition to the flat surface of the first ceramic piece. A cylindrical ceramic piece was then placed on top of the flat ceramic piece at the place having the wax composition markings. It was noted that the cylindrical ceramic piece did not move once placed on top of the flat ceramic piece. The flat ceramic piece was inverted and the cylindrical ceramic piece remained in place. The assembly was then placed into a furnace and heat was applied. The temperature was rate controlled to 110° C. for 3 hours to remove the wax. The temperature was then raised to 1200° C. for one hour to activate the glass powder, forming a permanent bond between the two ceramic pieces. The assembly was then allowed to cool and was removed from the furnace. The bond between the two ceramic pieces was not impaired.

The above description is only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A solid fritted bonding material consisting essentially of: a blended wax composition and a powder.

2. A solid fritted bonding material according to claim 1, wherein the blended wax composition comprises a combination of waxes selected from the group consisting of: microcrystalline waxes; processed beeswax; lanolin; plant waxes; and natural waxes.

3. A solid fritted bonding material according to claim 1, wherein the powder has a particle size less than about 20 mesh.

4. A solid fritted bonding material according to claim 3, wherein the powder is selected from the group consisting of: glass and metal.

5. A solid fritted bonding material according to claim 4, wherein the powder is a glass.

6. A solid fritted bonding material according to claim 1, further consisting of a dispersant and a pigment.

* * * * *